April 12, 1932.   A. B. NORTON   1,853,450
PISTON
Filed Aug. 22, 1925   2 Sheets-Sheet 1
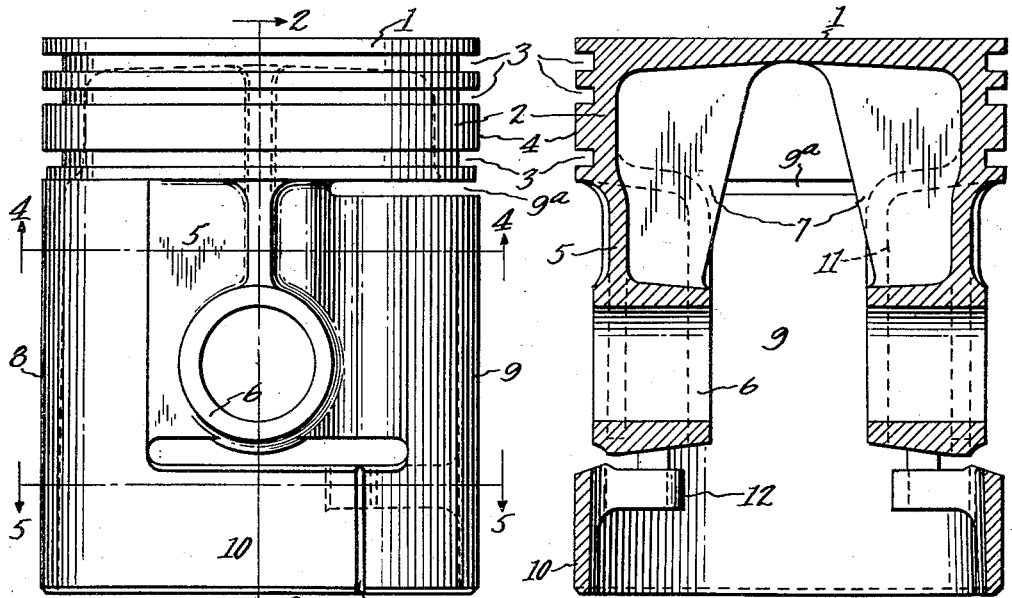
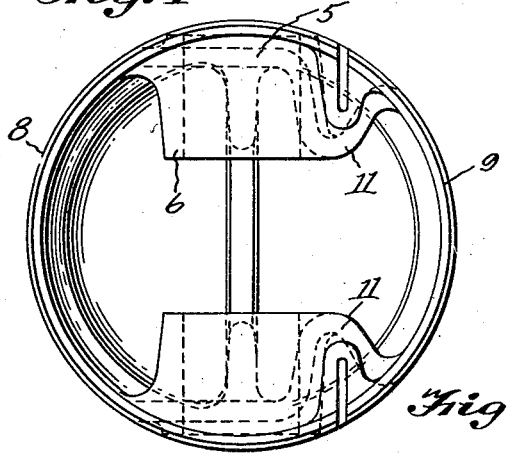
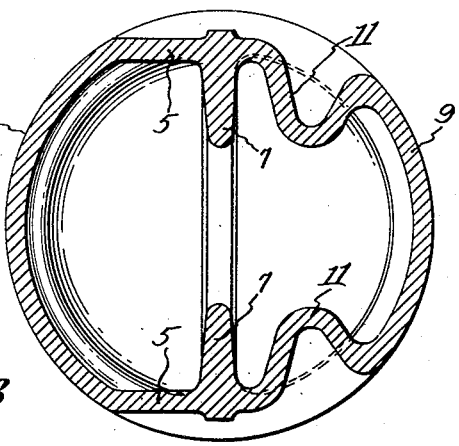
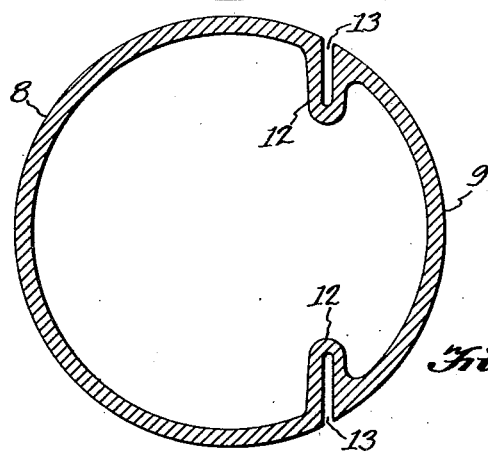
INVENTOR
Allen B. Norton
BY
Richey, Hough & Watts
ATTORNEY April 12, 1932.  A. B. NORTON  1,853,450
PISTON
Filed Aug. 22, 1925  2 Sheets-Sheet 2

INVENTOR
Allen B. Norton
BY
Richey, Slough & Watts
ATTORNEY

Patented Apr. 12, 1932

1,853,450

UNITED STATES PATENT OFFICE

ALLEN B. NORTON, OF CLEVELAND, OHIO, ASSIGNOR, BY MESNE ASSIGNMENTS, TO THE CLEVELAND TRUST COMPANY, OF CLEVELAND, OHIO, A CORPORATION OF OHIO, TRUSTEE

PISTON

Application filed August 22, 1925. Serial No. 51,748.

This application relates to pistons for internal combustion engines and particularly to pistons in which one bearing wall of the skirt is disconnected from the head and resiliently or flexibly connected to other parts of the skirt.

It also relates to a piston having a head and a skirt integrally connected, and with a part of the skirt being capable of bodily movement relative to the head and to the remainder of the skirt.

In the drawings attached hereto and forming a part of this specification:

Figure 1 is a view in side elevation of a piston constructed in accordance with my invention.

Figure 2 is a sectional view taken on line 2—2 of Fig. 1.

Figure 3 is an open end view of the piston shown in Fig 1.

Figures 4 and 5 are sectional views taken on lines 4—4 and 5—5 of Fig. 1.

Figures 6, 7:
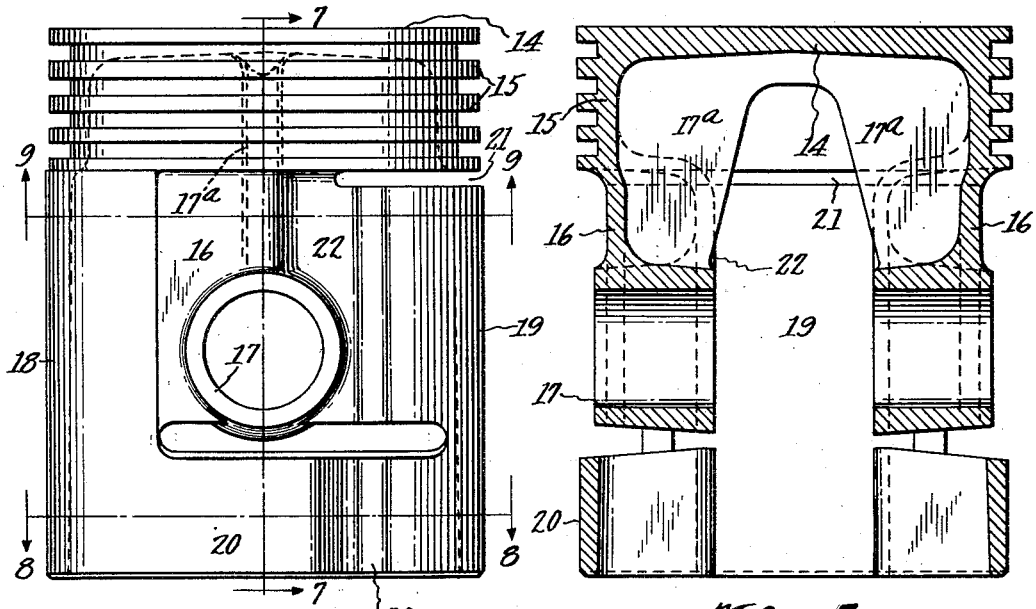

Figure 6 is a view similar to Fig. 1 but showing a modified form of piston.

Figure 7 is a view taken on line 7—7 of Fig. 6.

Figure 8:
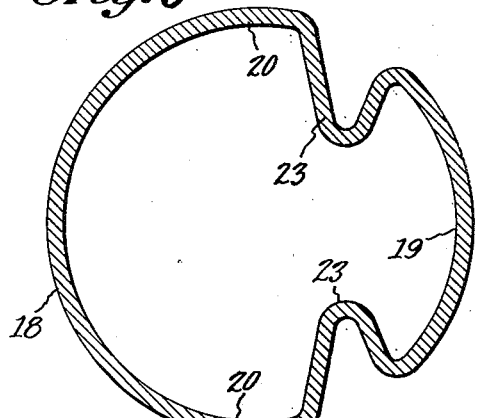
Figure 10:
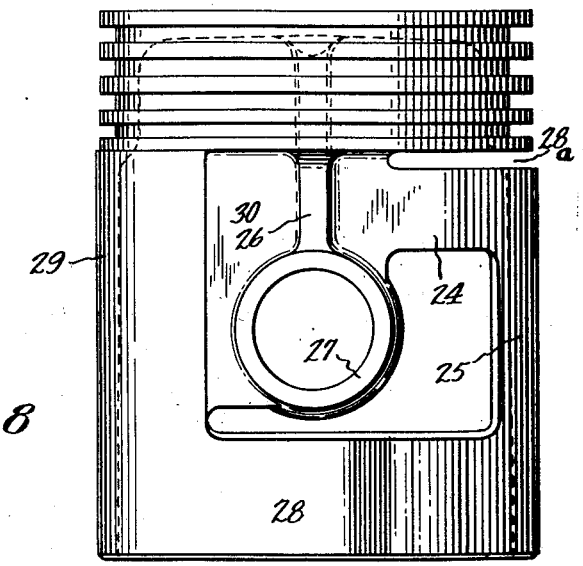
Figure 9:
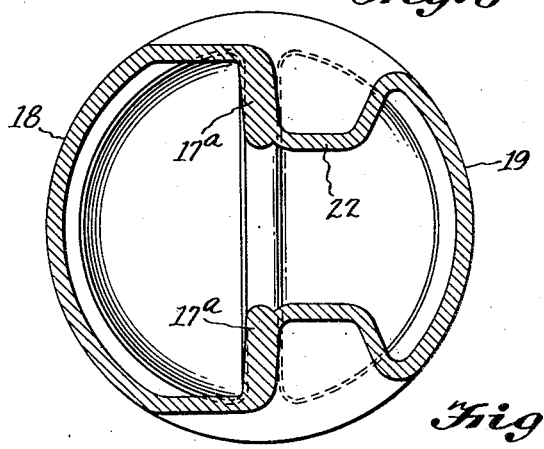

Figures 8 and 9 are sectional views taken on lines 8—8 and 9—9 of Fig. 6 respectively, and Figure 10 is a view similar to Figs. 1 and 6, but showing another modified form of piston embodying my invention.

Referring first to Figs. 1 to 5, inclusive, the piston shown comprises a head consisting of an end wall or disc 1, and a depending ring flange 2 on the outer surface of which is formed a plurality of grooves 3 for rings (not shown). The outer surface of the flange is also provided with a relatively wide, circumferentially extending bearing surface 4 of such diametrical dimensions as substantially to engage with the walls of the cylinder in which the piston is operated when at operating temperature. From opposite sides of the ring flange 2, webs 5 carrying aligned bosses 6 depend and are integrally connected thereto. These webs and the bosses may be additionally strengthened as by ribs 7 integral therewith which extend from the end wall 1 of the head and are also integrally united with the ring flange 2.

The skirt of the piston consists of two oppositely disposed bearing walls 8 and 9 which are joined together at the lower end by curved, substantially cylindrical bearing walls 10. The bearing wall 8 is integrally connected to the ring flange 2 and also to the boss carrying webs 5 on one side of the bosses 6 as shown in the figures. The circumferential length of this connection between the flange 2 and bearing wall 8 may be varied from the maximum as shown by providing one or more air gaps therebetween, but preferably the bearing wall and flange are at all times connected midway between the sides of the bearing wall. The bearing wall 9 is separated from direct contact with the head, or ring flange 2 thereof by an air gap 9a and is resiliently or flexibly connected to the adjacent parts of the piston. The resilient or flexible connecting means as shown in these figures comprises a reversely curved flexible web 11 extending from the depending boss carrying webs 5 and integrally joining this bearing wall. The flexible connection also includes a resilient or flexible wall 12 spanning a split 13 which extends through the curved walls 10. If desired the curved walls 10 may be omitted entirely.

In the operation of this piston in its cylinder, the bearing wall 9, being flexibly and resiliently carried by the yieldable webs 11, is capable of a limited movement bodily toward or away from the center of the piston due to the flexible connection above described. As the piston expands and tends to fit too tightly in the cylinder the webs 11 may yield and permit this bearing wall to move inwardly of the piston thereby relieving the close contact of the piston and cylinder and preventing scoring. While this piston is applicable to various metals, it may be utilized to good advantage with aluminum alloys where the metal tends to expand to a greater extent than the cast iron of a cylinder of an internal combustion engine in which it is to reciprocate.

Referring now to Figs. 6 to 9, inclusive, the piston shown in these figures consists of a head having an end wall or disc 14 and a depending ring flange 15 from which on opposite sides depend webs 16 in which bosses 17 are carried in substantial alignment with each other. Ribs 17a integral with the disc 14, flange 15 and bosses 17 serve to support the bosses. The skirt of the piston is composed of two oppositely disposed bearing walls 18 and 19 preferably connected at their lower ends by curved bearing walls 20 which are spaced apart from the webs 16 and bosses 17. The bearing wall 18 is connected directly and integrally to the ring flange of the piston and also to each of the boss carrying webs 16 on one side of the bosses 17. The bearing wall 19 is spaced apart from the head by an air gap 21 and is joined to adjacent parts of the skirt by flexible or resilient connections which may comprise reversely curved webs 22 extending from the ribs 17a and bosses 17 and flange 15 to and integrally uniting with this bearing wall 19. The curved walls 20 are each reversely curved as indicated at 23 and join with the bearing wall 19.

The piston shown in these figures functions substantially like that shown in Figs. 1 to 5 and for substantially the same reasons.

Referring now to Fig. 10, the piston shown in this figure resembles substantially in all respects the piston shown in Figs. 6 to 9, inclusive, except that the webs 24, which resemble webs 22 of Fig. 9 and which flexibly or resiliently join the bearing wall 25 of the skirt to the boss strengthening ribs on one side of the bosses 27, are relatively narrow, measured lengthwise of the piston. Although I have shown web 24 extending downwardly from transverse slot 28 to a point substantially even with the top of bosses 27, I may at times prefer to extend this downward still further and by varying the vertical height of this flexing web to obtain varying degrees of flexibility or rigidity. It will be noted that these webs 24 extend from the air gap 28a, which separates the ring flange 29 from the bearing wall 25, downwardly only a short distance, or, as shown, to a point substantially even with the top of the bosses 27. The curved walls 28 which join the lower ends of bearing walls 25 and 29 are substantially like wall 23 of the piston of Figs. 6 to 9. Such construction is amply strong since the piston is assembled in a cylinder with the bearing wall 25 on the side of minimum thrust. The flexible webs 24 need absorb only the relatively slight angular thrust of the piston and may be constructed with any desirable degree of flexibility or resiliency. The thinner and narrower these walls are the more flexible will be the connection of the bearing wall to the remaining parts of the skirt.

Having thus described my invention so that those skilled in the art will be able to practice the same, what I desire to secure by Letters Patent is defined in what is claimed, it being understood that various changes in the pistons shown and described above in detail and not amounting to invention may be made without departing from the spirit and scope of my invention.

What is claimed is:

1. A piston for an internal combustion engine comprising a head, boss carrying webs depending from the head, and a skirt connected to the head and webs, said skirt comprising oppositely disposed continuous bearing walls one of which carries at one end of the piston narrow curved walls free from said webs, the other of the bearing walls being spaced apart from the head and resiliently connected to said webs and narrow curved walls.

2. A piston for an internal combustion engine comprising a head having a depending ring flange, boss carrying webs depending from the flange, flexible cross webs integral with and disposed on one side of the bosses, a skirt having oppositely disposed uninterrupted bearing walls connected to each other at one end of the piston by continuous curved flexible walls free from said webs, one of the bearing walls being separated from the head and ring flange and supported by the said cross webs and curved walls for bodily movement with respect thereto.

3. A piston for an internal combustion engine comprising a head having a depending ring flange, boss carrying webs depending from the flange, cross webs extending laterally on one side of the bosses, a skirt having oppositely disposed bearing walls connected by continuous flexible curved walls, one of the bearing walls being separated from the head and ring flange and supported by the said cross webs and curved walls for bodily movement with respect thereto, the other of the bearing walls being connected directly to the said ring flange and also to the said depending webs.

4. A one piece piston for an internal combustion engine comprising a head having a depending ring flange, oppositely disposed boss carrying webs depending from the ring flange, a cylinder engaging bearing wall connected to the flange and webs on one side of the bosses, a second cylinder engaging bearing wall disposed on the side of the bosses opposite to the first said bearing wall separated from the head and flexibly connected to the said depending webs and the first said bearing wall by continuous curved walls having resilient bends.

5. A piston for an internal combustion engine comprising a head, boss carrying webs depending from the head, and a skirt connected to the head and webs, said skirt comprising oppositely disposed unbroken bearing walls, one of the said bearing walls being connected directly to the head and depending webs and the other bearing wall being spaced apart from the head and resiliently connected to the said depending webs by a web having a resilient bend.

6. A piston for an internal combustion engine comprising a head, boss carrying webs depending from the head, a bearing wall connected directly to the head and boss carrying webs, and an oppositely disposed one piece bearing wall separated from the head and connected to the said webs and bearing wall for bodily movement relative thereto.

7. A one piece piston for an internal combustion engine comprising a head, boss carrying webs depending from the head, a bearing wall connected directly to the head and boss carrying webs, and an oppositely disposed bearing wall separated from the head and connected to the said depending webs for bodily movement relative thereto by webs having resilient bends.

8. A piston comprising a head, boss carrying webs depending therefrom, and a skirt comprising oppositely disposed continuous bearing walls, one of which is integrally connected to the head and the other of which is spaced therefrom, the first bearing wall being rigidly and the second resiliently connected to the depending webs, and narrow curved walls extending between the lower ends of the bearing walls below the boss carrying webs and provided intermediate their ends with the resilient bends.

9. A piston comprising a head, boss carrying webs depending therefrom, a skirt comprising bearing faces, one of which is rigidly and the other resiliently connected to said depending webs, narrow curved walls connecting the bottoms of said bearing faces below the webs, each of said walls being provided with a resilient bend below the corresponding boss.

10. A piston comprising a head, boss carrying webs depending therefrom, and spaced bearing faces resiliently connected together by narrow continuous curved flexible walls, one of said bearing faces being resiliently, and the other directly and rigidly, connected to said webs.

11. A piston comprising a head, and a skirt consisting of oppositely disposed arcuate bearing walls, one of said walls extending continuously through more than 180 degrees of arc, and the other of said walls being flexibly connected to said one wall.

12. A piston comprising a head and oppositely disposed continuous bearing faces constituting a skirt, said bearing faces being flexibly associated with said head for bodily movement relative to each other, and flexible means integral with one of said bearing faces for maintaining the curvature thereof within a pre-determined limit as said bearing face expands.

13. A piston comprising a head, boss carrying webs depending from said head, and a skirt comprising oppositely disposed bearing walls connected to said webs and having their adjacent edges spaced to provide openings for said bosses, a portion of one of said walls being extended through more than a semicircle and arranged to restrict the decrease in curvature of said wall as said skirt expands under the influence of heat.

14. A piston comprising a head, boss carrying webs depending from said head, and a skirt comprising bearing walls connected to said webs, flexible means connecting said bearing walls, and means forming a part of one of said walls for restricting the decrease in curvature of said wall as said skirt expands.

15. A piston for an internal combustion engine comprising a head, depending webs integral with said head and having piston pin bosses integral therewith, a pair of skirt sections flexibly connected together at one end of the piston, and cross webs integral with said skirt sections and disposed on opposite sides of, and integral with, said bosses and depending webs, the cross webs on one side of said bosses extending vertically from points adjacent said head to the lower ends of said bosses, certain of said cross webs being flexible.

16. A piston for an internal combustion engine comprising a head, depending boss carrying webs integral with said head, a pair of skirt sections flexibly connected together at one end of the piston, and cross webs integral with said skirt sections and disposed on opposite sides of, and integral with, said bosses and depending webs, and extending from points adjacent said head to the lower ends of said bosses, certain of said cross webs being flexible.

In testimony whereof I hereunto affix my signature this 12th day of August, 1925.

ALLEN B. NORTON.